United States Patent
Kato et al.

(10) Patent No.: US 8,892,319 B2
(45) Date of Patent: Nov. 18, 2014

(54) POWER TRANSMITTING APPARATUS

(75) Inventors: Shunya Kato, Toyota (JP); Tooru Matsubara, Toyota (JP); Kenta Kumazaki, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 13/574,917

(22) PCT Filed: Mar. 5, 2010

(86) PCT No.: PCT/JP2010/053664
§ 371 (c)(1),
(2), (4) Date: Jul. 24, 2012

(87) PCT Pub. No.: WO2011/108114
PCT Pub. Date: Sep. 9, 2011

(65) Prior Publication Data
US 2012/0323456 A1   Dec. 20, 2012

(51) Int. Cl.
| | |
|---|---|
| G06F 7/00 | (2006.01) |
| G06F 19/00 | (2011.01) |
| B60W 30/19 | (2012.01) |
| B60W 10/08 | (2006.01) |
| B60W 10/105 | (2012.01) |
| B60W 10/115 | (2012.01) |
| F16H 61/08 | (2006.01) |
| F16H 37/08 | (2006.01) |

(52) U.S. Cl.
CPC ............ B60W 30/19 (2013.01); B60W 10/08 (2013.01); B60W 10/105 (2013.01); B60W 10/115 (2013.01); F16H 60/0437 (2013.01); F16H 61/08 (2013.01); B70W 20/00 (2013.01); F16H 2037/0873 (2013.01)
USPC ............ 701/55; 701/22; 701/51; 701/54

(58) Field of Classification Search
CPC . B60W 10/08; B60W 10/105; B60W 10/115; B60W 20/00
USPC ............ 701/22, 51, 54, 55; 180/65.265; 903/930
See application file for complete search history.

(56) References Cited

U.S. PATENT DOCUMENTS 6,322,478 B1 * 11/2001 Jackson .................. 477/109
7,537,544 B2 * 5/2009 Iida ......................... 477/108
(Continued)

FOREIGN PATENT DOCUMENTS

| JP | A-2008-230367 | 10/2008 |
| JP | A-2009-067120 | 4/2009 |
| JP | A-2009-149120 | 7/2009 |

OTHER PUBLICATIONS

International Search Report issued in Application No. PCT/JP2011/053664; Dated Jun. 8, 2010 (With Translation).

*Primary Examiner* — Khoi Tran
*Assistant Examiner* — Jorge Peche
(74) *Attorney, Agent, or Firm* — Oliff PLC

(57) ABSTRACT

A power transmission apparatus is provided with a control device for starting each of first shift control, which is control associated with shifting of a stepless transmission unit, and second shift control, which is control associated with shifting of a stepped transmission unit, such that shift end timing of the stepless transmission unit is synchronized with shift end timing of the stepped transmission unit, in a condition that shift requests for the stepless transmission unit and the stepped transmission unit are detected in the same timing. According to the power transmitting apparatus, each of the first shift control and the second shift control is started such that the shift end timing of the stepless transmission unit is synchronized with the shift end timing of the stepped transmission unit.

14 Claims, 9 Drawing Sheets

(56) References Cited

U.S. PATENT DOCUMENTS

| | | | |
|---|---|---|---|
| 7,998,021 B2* | 8/2011 | Matsubara et al. | 477/3 |
| 2008/0132379 A1* | 6/2008 | Matsubara et al. | 477/3 |
| 2008/0208422 A1* | 8/2008 | Shibata et al. | 701/54 |
| 2008/0234914 A1* | 9/2008 | Tabata et al. | 701/99 |
| 2009/0069147 A1* | 3/2009 | Tabata et al. | 477/3 |
| 2009/0151491 A1* | 6/2009 | Tabata et al. | 74/335 |
| 2012/0053769 A1* | 3/2012 | Kumazaki et al. | 701/22 |
| 2012/0077638 A1* | 3/2012 | Kumazaki et al. | 477/5 |
| 2012/0077639 A1* | 3/2012 | Shibata et al. | 477/20 |
| 2012/0108384 A1* | 5/2012 | Tabata et al. | 477/3 |
| 2012/0283065 A1* | 11/2012 | Imamura et al. | 477/35 |

* cited by examiner

|  | C1 | C2 | C3 | B1 | B2 | F1 | Gear ratio |
|---|---|---|---|---|---|---|---|
| 1st | O |  |  |  | (O) | O | 3.20 |
| 2nd | O |  |  | O |  |  | 1.72 |
| 3rd | O | O |  |  |  |  | 1.00 |
| 4th |  | O |  | O |  |  | 0.67 |
| Rev |  |  | O |  | O |  | 2.04 |

(O) indicates only at the time of engine braking

POWER TRANSMITTING APPARATUS

TECHNICAL FIELD

The present invention relates to a power transmitting apparatus, mounted on a vehicle, such as, for example, an automobile, and provided with a stepless transmission unit and a stepped transmission unit.

BACKGROUND ART

As this type of apparatus, for example, there has been suggested a power transmitting apparatus provided with a first transmission unit and a second transmission unit, wherein the first transmission unit and the second transmission are controlled by a first electric motor and a second electric motor, respectively, such that shifting of one of the first transmission unit and the second transmission unit ends during shifting of the other unit, if the shifting of the first transmission unit and the second transmission is performed in parallel and if the first transmission unit and the second transmission have mutually different directions of a change in a transmission gear ratio (refer to Patent Document 1).

Alternatively, for example, there has been suggested a control apparatus of an in-vehicle power transmitting apparatus provided with: a first transmission unit; a second transmission unit; and an electric motor coupled with a rotational element of the first transmission unit or the second transmission unit, wherein start timing of an inertia phase of at least one of the first transmission unit and the second transmission unit is controlled by the electric motor, if the shifting of the first transmission unit and the second transmission is simultaneously performed and if the first transmission unit and the second transmission have mutually different directions of the change in the transmission gear ratio (refer to Patent Document 2).

PRIOR ART DOCUMENT

Patent Document

Patent document 1: Japanese Patent Application Laid Open No. 2009-67120
Patent document 2: Japanese Patent Application Laid Open No. 2009-149120

DISCLOSURE OF INVENTION

Subject to be Solved by the Invention

According to the aforementioned background art, however, the first transmission unit and the second transmission unit have mutually different shift end timing. Here, in a case where the first transmission unit and the second transmission unit are the stepless transmission unit and the stepped transmission unit, respectively, for example, if the shifting of the stepless transmission unit ends during the shifting of the stepped transmission unit, drivability possibly deteriorates due to fluctuations of a driving force, which is technically problematic. Alternatively, if the shifting of the stepped transmission unit ends during the shifting of the stepless transmission unit, it takes a longer time for the shifting, which is technically problematic. Incidentally, those technical problems are not disclosed in the aforementioned Patent Documents.

In view of the aforementioned problems, it is therefore an object of the present invention to provide a power transmitting apparatus capable of suppressing the deterioration of the drivability and capable of reducing the time for the shifting.

DISCLOSURE OF INVENTION

Subject to be Solved by the Invention

The above object of the present invention can be achieved by a power transmitting apparatus, mounted on a vehicle and comprising a stepless transmission unit and a stepped transmission unit, said power transmission apparatus provided with a control device for starting each of first shift control, which is control associated with shifting of the stepless transmission unit, and second shift control, which is control associated with shifting of the stepped transmission unit, such that shift end timing of the stepless transmission unit is synchronized with shift end timing of the stepped transmission unit, in a condition that shift requests for the stepless transmission unit and the stepped transmission unit are detected in the same timing.

According to the power transmitting apparatus of the present invention, the power transmitting apparatus is mounted on the vehicle, such as, for example, an automobile. The power transmitting apparatus is provided with the stepless transmission unit including, for example, an electric continuously variable transmission (CVT) or the like, and the stepped transmission unit including, for example, a mechanical transmission or the like.

The control device, which is provided with, for example, a memory, a processor, or the like, starts each of the first shift control, which is control associated with the shifting of the stepless transmission unit, and the second shift control, which is control associated with the shifting of the stepped transmission unit, such that the shift end timing of the stepless transmission unit is synchronized with the shift end timing of the stepped transmission unit, in the condition that the shift requests for the stepless transmission unit and the stepped transmission unit are detected in the same timing.

The expression that the "shift requests for the stepless transmission unit and the stepped transmission unit are detected in the same timing" is not limited to that a time point at which the shift request for the stepless transmission unit is detected "matches" a time point at which the shift request for the stepped transmission unit, but may mean that the shift request for the stepless transmission unit and the shift request for the stepped transmission unit are detected in a period practically regarded as "matching".

Incidentally, cases where the shift requests for the stepless transmission unit and the stepped transmission unit are detected in the same timing include, for example, (i) a case where the shifting of the stepless transmission unit and the stepped transmission unit is simultaneously performed at the time of sequential shifting, (ii) a case where the oil temperature of at least one of the stepped transmission unit and the stepless transmission unit increases and the shifting of the stepless transmission unit and the stepped transmission unit is simultaneously performed, (iii) a case where at least one of the stepped transmission unit and the stepless transmission unit fails and the shifting of the stepless transmission unit and the stepped transmission unit is simultaneously performed as a fail safe mode, and the like.

The expression of "such that shift end timing of the stepless transmission unit is synchronized with shift end timing of the stepped transmission unit" is not limited to "to match" the shift end timing of the stepless transmission unit with the shift end timing of the stepped transmission unit, but may mean to include a difference between the shift end timing of the stepless transmission unit and the shift end timing of the stepped transmission unit, in a period practically regarded as "matching" (e.g. within 0.2 seconds).

The expression of "starting each of first shift control, which is control associated with shifting of the stepless transmission unit, and second shift control, which is control associated with shifting of the stepped transmission unit, such that shift end timing of the stepless transmission unit is synchronized with shift end timing of the stepped transmission unit" means setting each of timing to start the first shift control and timing to start the second shift control such that the shift end timing of the stepless transmission unit is synchronized with the shift end timing of the stepped transmission unit, and starting each of the first shift control and the second shift control in the set timing.

According to the study of the present inventors, the following matters are found; namely, if the shifting of the stepless transmission unit ends during the shifting of the stepped transmission unit, a driving force varies due to a reduction in torque calculation accuracy. If the shifting of the stepped transmission unit ends during the shifting of the stepless transmission unit, the shifting of the stepless transmission unit is interrupted, and thus, a shift period becomes relatively long.

In the present invention, however, each of the first shift control, which is control associated with the shifting of the stepless transmission unit, and the second shift control, which is control associated with the shifting of the stepped transmission unit, is started such that the shift end timing of the stepless transmission unit is synchronized with the shift end timing of the stepped transmission unit, in the condition that the shift requests for the stepless transmission unit and the stepped transmission unit are detected in the same timing. As a result, the shift end timing of the stepless transmission unit is synchronized with the shift end timing of the stepped transmission unit, and thus, it is possible to suppress the deterioration of the drivability and to suppress the long shift period.

In one aspect of the power transmitting apparatus of the present invention, said control device changes a shift rate of the stepless transmission unit at the start of an inertia phase of the stepped transmission unit or during the inertia phase, if the first shift control and the second shift control are started such that the shift end timing of the stepless transmission unit is synchronized with the shift end timing of the stepped transmission unit and if there is a gap between a time point at which at least one of the first shift control and the second shift control is actually started and a time point for which the start of the at least one control is scheduled.

According to this aspect, the control device changes the shift rate of the stepless transmission unit at the start of the inertia phase of the stepped transmission unit or during the inertia phase, if the first shift control and the second shift control are started such that the end timing of the stepless transmission unit is synchronized with the end timing of the stepped transmission unit and if there is the gap between the time point at which at least one of the first shift control and the second shift control is actually started and the time point for which the start of the at least one control is scheduled, due to, for example, a scatter of control, a calculation error in timing calculation, or the like.

The "shift rate" means an amount to control the transmission unit for the shifting per unit time (i.e. a control amount or controlled variable per unit time). Therefore, the expression of "... changes the shift rate" means to increase or reduce the control amount or controlled variable per unit time.

According to this aspect, it is possible to improve the synchronization accuracy of the shift end timing of each of the stepless transmission unit and the stepped transmission unit, which is extremely useful in practice.

In another aspect of the power transmitting apparatus of the present invention, said control device includes an operating device for operating a first shift time, which is a time for the first shift control, and a second shift time, which is a time for the second shift control, and starts each of the first shift control and the second shift control in accordance with a difference between the operated first shift time and the operated second shift time, such that the shift end timing of the stepless transmission unit is synchronized with the shift end timing of the stepped transmission unit.

According to this aspect, the operating device, which is provided with, for example, a memory, a processor, or the like, operates the first shift time, which is the time for the first shift control, and the second shift time, which is the time for the second shift control.

The control device starts each of the first shift control and the second shift control in accordance with the difference between the operated first shift time and the operated second shift time, such that the shift end timing of the stepless transmission unit is synchronized with the shift end timing of the stepped transmission unit.

According to this aspect, it is possible to synchronize the shift end timing of the stepless transmission unit with that of the stepped transmission unit, relatively easily, which is extremely useful in practice.

In another aspect of the power transmitting apparatus of the present invention, the stepless transmission unit has: a differential mechanism including a plurality of rotating elements; a first electric motor connected to one of the plurality of rotating elements; and a second electric motor connected to another rotating element of the plurality of rotating elements.

According to this aspect, the stepless transmission unit has: the differential mechanism including the plurality of rotating elements, such as, for example, planetary gear mechanisms; the first electric motor connected to one of the plurality of rotating elements; and the second electric motor connected to another rotating element of the plurality of rotating elements. In other words, the stepless transmission unit has an electric CVT.

Incidentally, if the differential mechanism is a planetary gear mechanism, the one rotating element is, for example, a sun gear, and the another rotating element is, for example, a ring gear.

According to this aspect, it is possible to appropriately suppress the occurrence of a shift shock, which is extremely useful in practice.

In another aspect of the power transmitting apparatus of the present invention, the stepless transmission unit and the stepped transmission unit are connected to each other in series between a power source of the vehicle and an output shaft of the vehicle.

According to this aspect, by changing each of a transmission gear ratio of the stepless transmission unit and a transmission gear ratio of the stepped transmission unit, it is possible to relatively increase a change width of a transmission gear ratio of the entire power transmitting apparatus.

The operation and other advantages of the present invention will become more apparent from embodiments explained below.

MODE FOR CARRYING OUT THE INVENTION

Hereinafter, embodiments of the power transmitting apparatus of the present invention are explained with reference to the drawings.

First Embodiment

A first embodiment of the power transmitting apparatus of the present invention is explained with reference to FIG. 1 to FIG. 9.

Figures 1, 2:
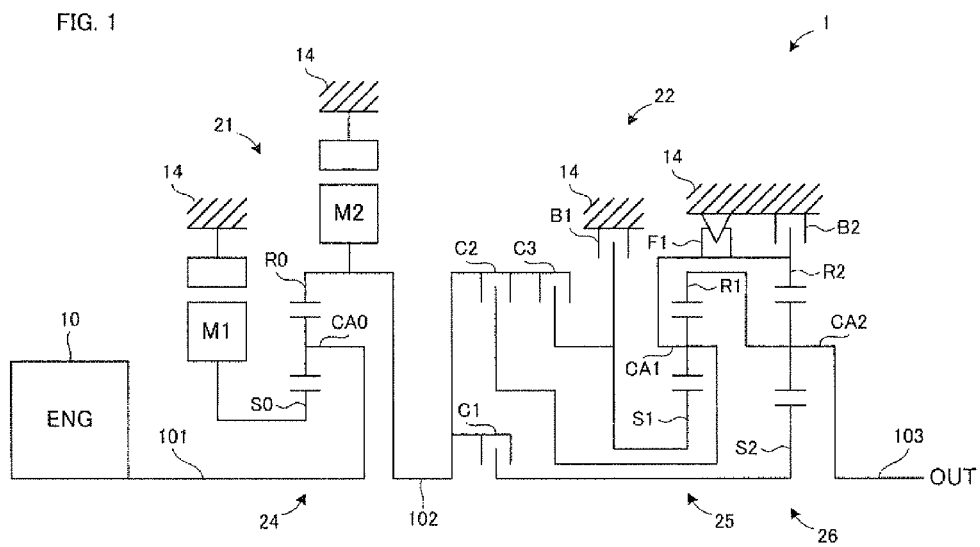
FIG. 1 is a main-part diagram explaining a configuration of a power transmitting apparatus in a first embodiment.
FIG. 2 is an operation table explaining a relation between shift operation if a stepped transmission unit of the power transmitting apparatus in the first embodiment is operated, and a combination of operation of hydraulic friction engaging apparatuses used thereto.

Firstly, a configuration of the power transmitting apparatus in the first embodiment is explained with reference to FIG. 1. FIG. 1 is a main-part diagram explaining the configuration of the power transmitting apparatus in the first embodiment. Incidentally, the lower side of the power transmitting apparatus in the main-part diagram in FIG. 1 is omitted because the power transmitting apparatus is configured to be symmetric to a shaft center thereof.

In FIG. 1, a power transmitting apparatus 1 is positioned on the common shaft center in a transmission case 14 (hereinafter referred to as a "case 14" as occasion demands) as a non-rotating member mounted on a body of a vehicle equipped with the power transmitting apparatus 1. The power transmitting apparatus 1 is provided with: an input shaft 101 as an input rotating member, coupled with an engine (ENG) 10 as a main power source, directly or indirectly via a not-illustrated pulsation absorbing damper (i.e. a vibration damping apparatus) or the like; a stepless transmission unit 21 coupled with the input shaft 101; a stepped transmission unit 22 coupled with the stepless transmission unit 21 in series via a transmitting member (i.e. a transmission shaft) 102 in a power transmission path between the stepless transmission unit 21 and driving wheels 16 (refer to FIG. 5); and an output shaft 103 as an output rotating member for transmitting an output of the stepped transmission unit 22 to a latter part. In other words, the power transmitting apparatus 1 is provided with the stepless transmission unit 21 and the stepped transmission unit 22 which are provided in series.

The power transmitting apparatus 1 is preferably used for, for example, a front-engine, rear-drive (FR) type vehicle in which the power transmitting apparatus 1 is placed in a longitudinal direction of the vehicle because an axial size thereof is relatively large. The power transmitting apparatus 1 is provided in the power transmission path, which leads to the pair of driving wheels 16 from the engine 10, and transmits power outputted from the engine 10 to the pair of driving wheels 16 via a differential gear unit (i.e. a final reduction gear unit) 15 (refer to FIG. 5) and a pair of axles or the like in order.

The engine 10 is the main power source for driving of the vehicle and is composed of an internal combustion engine, such as a gasoline engine and a diesel engine, and an external combustion engine, or the like. As shown in FIG. 1, in the power transmitting apparatus 1, the engine 10 is directly connected to the stepless transmission unit 21. Here, the expression of "being directly connected" means being coupled without via a hydraulic transmitting apparatus, such as a torque converter and a fluid coupling. For example, the coupling via the pulsation absorbing damper or the like described above is included in the concept of "being directly connected".

The stepless transmission unit 21 is provided with a planetary gear mechanism 24, a first electric motor M1, and a second electric motor M2. The planetary gear mechanism 24 is provided with a sun gear S0, a pinion gear, a carrier CA0 for supporting the pinion gear, rotatably and revolvably, and a ring gear R0.

The first electronic motor M1 is provided such that a rotor thereof rotates integrally with the sun gear S0 of the planetary gear mechanism 24. The second electronic motor M2 is provided such that a rotor thereof rotates integrally with the ring gear R0 of the planetary gear mechanism 24. Each of the rotors of the first electronic motor M1 and the second electronic motor M2 is connected to the case 14. Incidentally, the second electronic motor M2 may be provided in any portion which constitutes the power transmission path between the transmitting member 102 to the driving wheels 16.

The first electronic motor M1 is an electric motor having at least a generator (power generation) function for generating a reaction force. The second electronic motor M2 is an electric motor having at least a motor (electric motor) function for outputting a driving force, as a driving force source for driving. The first electronic motor M1 and the second electronic motor M2 are desirably so-called motor generators which also have the power generation function.

Incidentally, the "planetary gear mechanism 24", the "sun gear S0", and the "ring gear R0" in the first embodiment are one example of the "differential mechanism", the "one rotating element", and the "another rotating element" in the present invention, respectively.

In the stepless transmission unit 21, the carrier CA0 is coupled with the input shaft 101, i.e. the engine 10, the sun gear S0 is coupled with the first electric motor M1, and the ring gear R0 is coupled with the transmitting member 102. In the stepless transmission unit 21, the sun gear S0, the carrier CA0, and the ring gear R0 can perform relative rotation on one another. Thus, regardless of the number of revolutions of the engine 10, the number of revolutions of the transmitting member 102 continuously changes, i.e. being in a stepless shift state or a continuously variable state.

The stepped transmission unit 22 is provided with planetary gear mechanisms 25 and 26. The planetary gear mechanism 25 is provided with a sun gear S1, a pinion gear, a carrier CA1 for supporting the pinion gear, rotatably and revolvably, and a ring gear R1. The planetary gear mechanism 26 is provided with a sun gear S2, a pinion gear, a carrier CA2 for supporting the pinion gear, rotatably and revolvably, and a ring gear R2.

In the stepped transmission unit 22, the sun gear S1 is coupled selectively with the transmitting member 102 via a third clutch C3 and is coupled selectively with the case 14 via a first brake B1. The carrier CA1 and the ring gear R2, integrally coupled with each other, are coupled selectively with the transmitting member 102 via a second clutch C2 and are coupled selectively with the case 14 via a second brake B2. The carrier CA1 and the ring gear R2, integrally coupled with each other, are further coupled selectively with the case 14 via a one-way clutch F1, depending on a rotational direction thereof. The sun gear S2 is coupled selectively with the transmitting member 102 via a first clutch C1. The ring gear R1 and the carrier CA2, integrally coupled with each other, are coupled with the output shaft 103.

The first clutch C1, the second clutch C2, the third clutch C3, the first brake B1, and the second brake B2 are hydraulic friction engaging apparatuses, as engaging elements frequently used in known vehicle transmissions, and are wet multi-disc type engaging apparatuses in which a plurality of layered friction plates are pressed by a hydraulic actuator.

In the stepped transmission unit 22 as configured above, for example, as shown in an operation table in FIG. 2, the first clutch C1, the second clutch C2, the third clutch C3, the first brake B1, the second brake B2, and the one-way clutch F1 are selectively engaged, by which any of a first transmission gear ratio (i.e. a first shift position) to a fourth transmission gear ratio (i.e. a fourth shift position) or a reverse gear position (i.e. a reverse shift position) is selectively established, and a predetermined transmission gear ratio (i.e. input shaft rotational speed/output shaft rotational speed) is obtained for each gear position.

As shown in FIG. 2, the engagement of the first clutch C1, the second brake B2 (only at the time of engine braking), and the one-way clutch F1 establishes a first transmission gear position, for example, with a transmission gear ratio of "3.20". The engagement of the first clutch C1 and the first brake B1 establishes a second transmission gear position, for example, with a transmission gear ratio of "1.72". The engagement of the first clutch C1 and the second clutch C2 establishes a third transmission gear position, for example, with a transmission gear ratio of "1.00". The engagement of the second clutch C2 and the first brake B1 establishes a fourth transmission gear position, for example, with a transmission gear ratio of "0.67". The J5 engagement of the third clutch C3 and the second brake B2 establishes a reverse gear position, for example, with a transmission gear ratio of "2.04".

Figure 3:
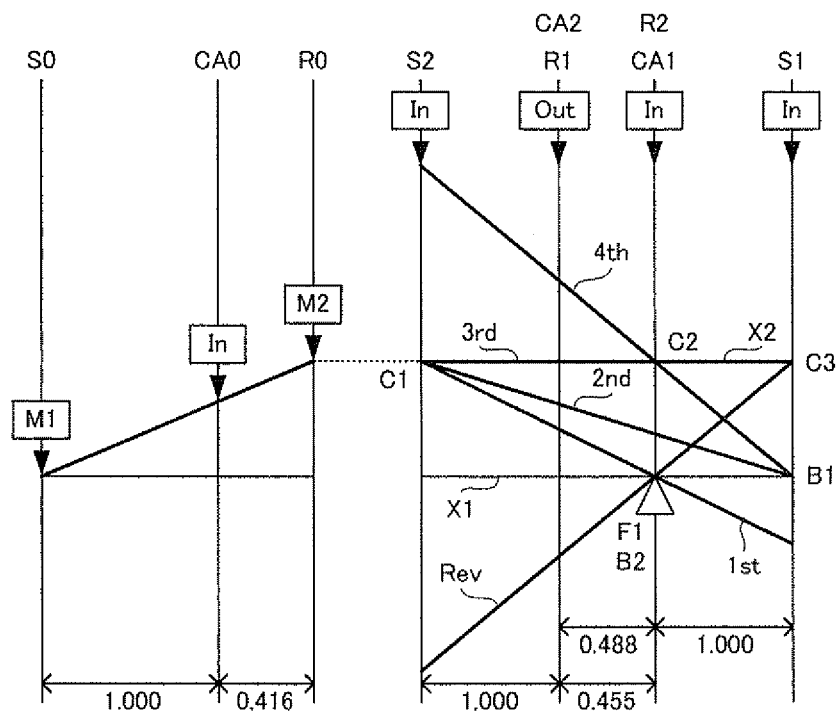
FIG. 3 is a nomogram explaining relative rotational speeds of respective gear positions if the power transmitting apparatus in the first embodiment is operated.

FIG. 3 is a nomogram capable of showing a relative relation in the rotational speed among respective rotating elements, each having different coupling states in respective gear positions, on straight lines. The nomogram in FIG. 3 shows a relative relation in the gear ratio among the planetary gear mechanisms 24, 25, and 26 in a horizontal-axis direction, and shows a relative rotational speed in a vertical-axis direction.

In FIG. 3, out of two horizontal lines X1 and X2, the horizontal line X1 indicates a rotational speed of zero, and the horizontal line X2 indicates a rotational speed of "1.0", i.e. a rotational speed of the transmitting member 102. On the other hand, seven vertical lines indicate, from the left in order, relative rotational speed ratios of the sun gear S0, the carrier CA0, the ring gear R0, the sun gear S2, the carrier CA2 and the ring gear R1 coupled with each other, the ring gear R2 and the carrier CA1 coupled with each other, and the sun gear S1.

Each interval between the vertical lines is set in accordance with the gear ratios of the planetary gear mechanisms 24, 25, and 26. In other words, as shown in FIG. 3, if the interval of the sun gear and the carrier is set to 1.000 in each of the planetary gear mechanisms 24, 25, and 26, the interval of the carrier and the ring gear corresponds to p.

In FIG. 3, the carrier CA0 of the planetary gear mechanism 24 is coupled with the input shaft 101, the sun gear S0 is coupled with the first electric motor M1, and the ring gear R0 is coupled with the second electric motor M2 and with the transmitting member 102. The sun gear S2 of the planetary gear mechanism 26 is coupled selectively with the transmitting member 102 via the first clutch C1. The ring gear R1 of the planetary gear mechanism 25 and the carrier CA2 of the planetary gear mechanism 26, integrally coupled with each other, are coupled with the output shaft 103. The ring gear R2 of the planetary gear mechanism 26 and the carrier CA1 of the planetary gear mechanism 25, integrally coupled with each other, are coupled selectively with the transmitting member 102 via the second clutch C2 and is coupled selectively with the case 14 via the second brake B2 and the one-way clutch F1. The sun gear S1 of the planetary gear mechanism 25 is coupled selectively with the transmitting member 102 via the third clutch C3 and is coupled selectively with the case 14 via the first brake B1.

Figure 4:
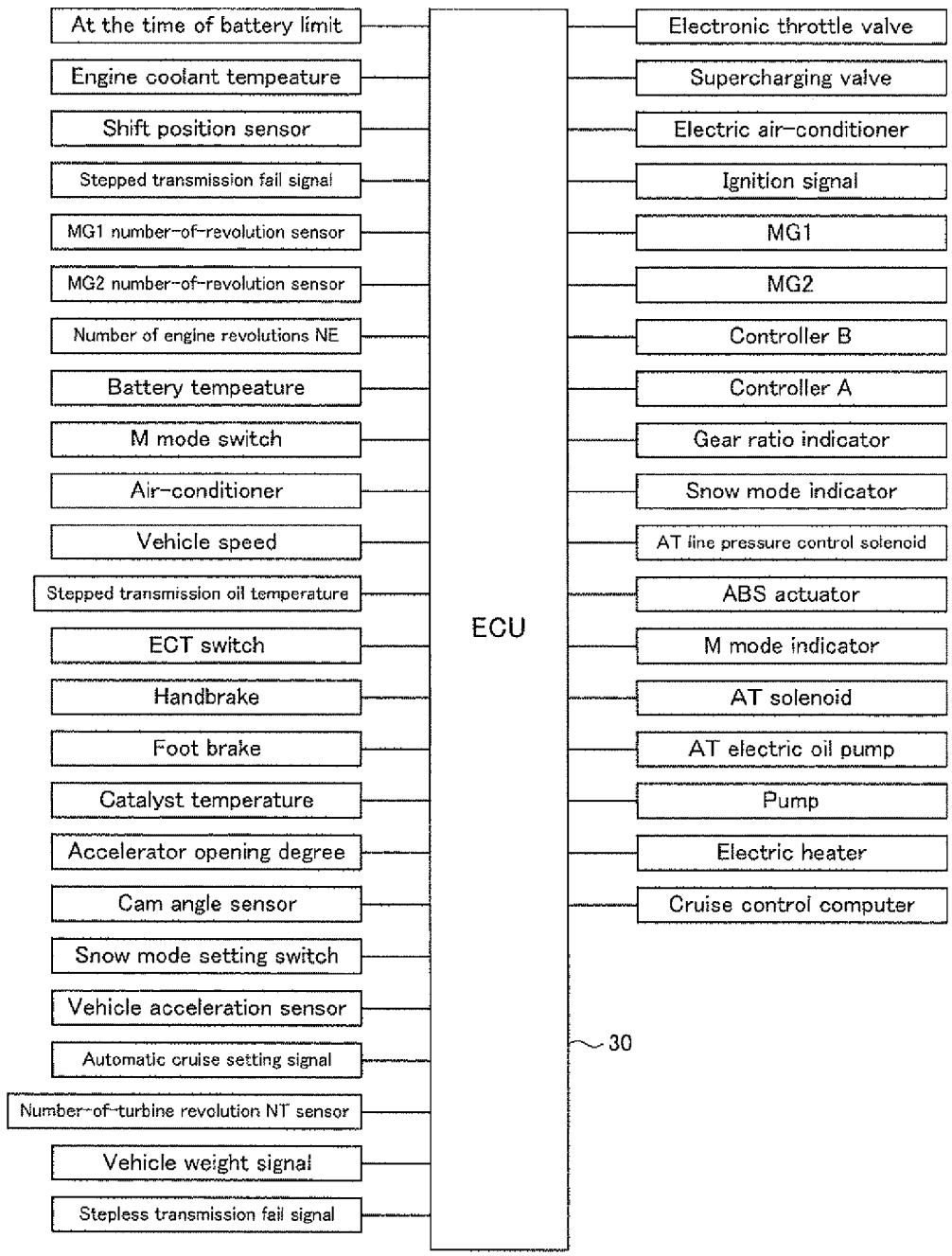
FIG. 4 is a diagram explaining an input/output signal of an electronic control unit provided for the power transmitting apparatus in the first embodiment.

FIG. 4 exemplifies a signal inputted to an electronic control unit (ECU) 30, which is a control apparatus for controlling the power transmitting apparatus 1 in the first embodiment, and a signal outputted from the electronic control unit 30. The electronic control unit 30 includes a so-called microcomputer provided with a central processing unit (CPU), a read only memory (ROM), a random access memory (RAM), an input/output interface, and the like. By performing signal processing in accordance with a program stored in advance in the ROM while using a temporal storage function of the RAM, the electronic control unit 30 performs drive control, such as hybrid drive control regarding the engine 10, the first electric motor M1, and the second electric motor M2, and shift control of the stepped transmission unit 22.

The electronic control unit 30 is supplied with a signal indicating at the time of a battery limit, a signal indicating an engine coolant temperature, a signal indicating the shift position, a fail signal associated with the stepped transmission unit 22, a signal indicating the number of revolutions of the first electric motor M1, a signal indicating the number of revolutions of the second electric motor M2, a signal indicating the number of engine revolutions, a signal indicating a battery temperature, a signal for commanding a M mode (manual shift driving mode), a signal indicating operation of an air-conditioner, a vehicle speed signal corresponding to the rotational speed of the output shaft 103, a signal indicating a hydraulic oil temperature of the stepped transmission unit 22, a signal for commanding electronic controlled transmission (ECT), a signal indicating a handbrake operation, a signal indicating a foot brake operation, a signal indicating a catalyst temperature, an accelerator opening degree signal indicating a manipulated variable or operation amount of an accelerator pedal, cam angle vibration, a signal indicating snow-mode setting, an acceleration signal indicating longitudinal acceleration of the vehicle, a signal indicating automatic cruise driving, a signal indicating the number of turbine revolutions, a signal indicating weight of the vehicle, a fail signal associated with the stepless transmission unit 21, and the like, from respective sensors and switches shown in FIG. 4.

On the other hand, the electronic control unit 30 outputs a driving signal to be supplied to a throttle actuator for operating an opening degree of a throttle valve, a signal for adjusting a supercharging pressure, a signal for operating an electric air-conditioner, an ignition signal for commanding ignition timing of the engine 10, a signal for commanding operation of the first electric motor M1, a signal for commanding operation of the first electric motor M2, a signal for commanding operation another electronic control unit which is different from the electronic control unit 30, a signal for operating a gear ratio indicator, a signal for displaying an indication of a snow mode, a signal for operating an antilock brake system (ABS) actuator for preventing a slip of wheels at the time of braking, a signal for displaying that a M mode is selected, a command signal for operating a solenoid valve included in a hydraulic control circuit 35 (refer to FIG. 5) in order to control a hydraulic actuator of the hydraulic friction engaging apparatuses of the stepped transmission unit 22, a signal for operating an electric hydraulic pressure pump as a hydraulic pressures source of the hydraulic control circuit 35, a signal for driving an electric heater, a signal to be supplied to a cruise control computer, and the like.

Figure 5:
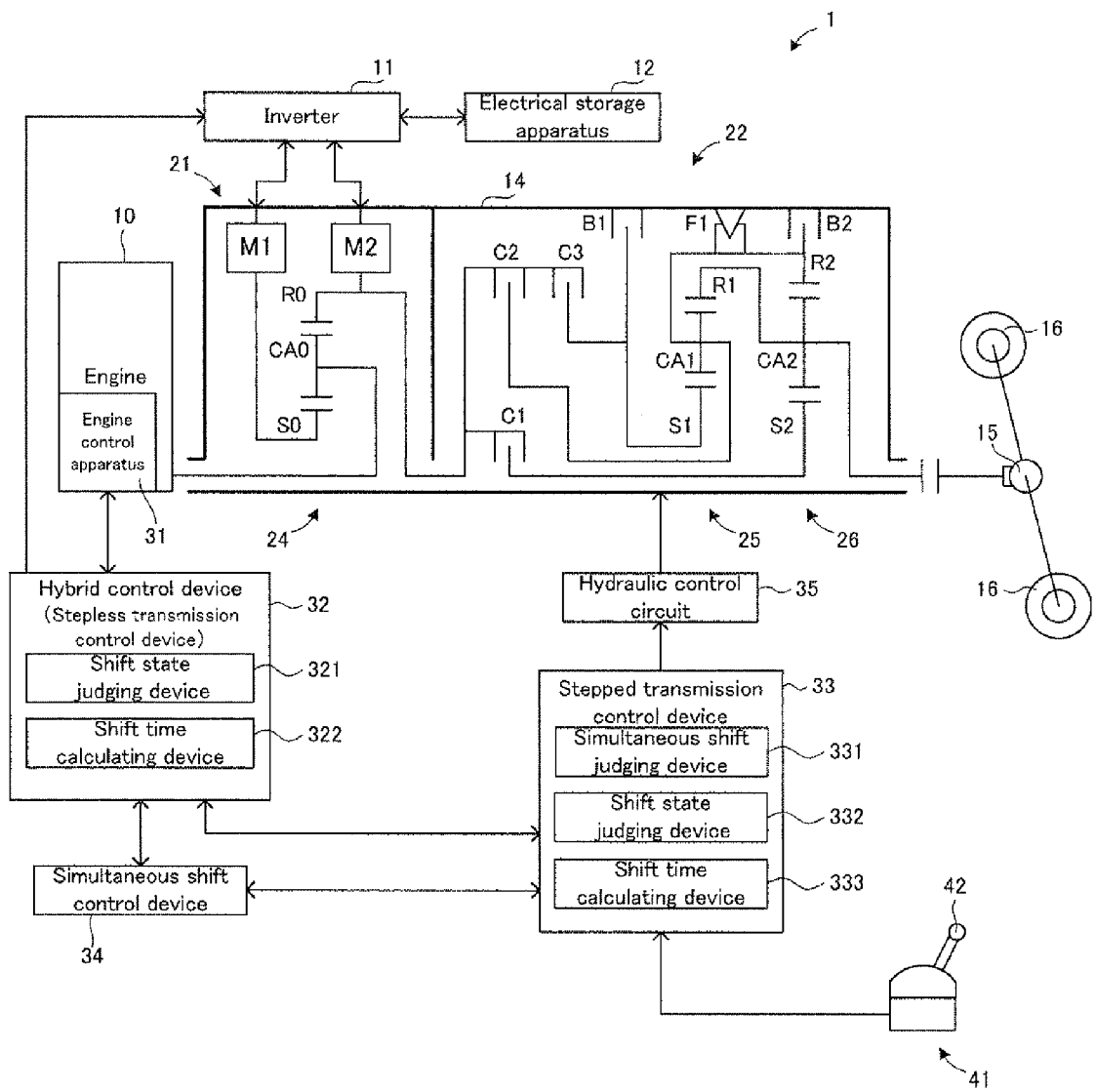
FIG. 5 is a functional block diagram explaining a main part of a control function provided for the electronic control unit in FIG. 4.

FIG. 5 is a functional block diagram explaining a method of controlling the power transmitting apparatus 1, i.e. a main part of a control function by the electronic control unit 30.

A hybrid control device 32 performs the hybrid drive control for controlling each of the engine 10, the first electric motor M1, and the second electric motor M2. The hybrid control device 32 controls, via an engine control apparatus 31, for example, opening/closing of an electronic throttle valve by using a throttle actuator, for throttle control; an fuel injection amount and injection timing by a fuel injection apparatus, for fuel injection control; and ignition timing by an ignition apparatus such as an igniter, for ignition timing control.

The hybrid control device 32 also functions as a stepless transmission control device. In other words, the hybrid control device 32 appropriately changes allocation of the driving force between the engine 10 and the second electric motor M2 and the reaction force caused by the power generation by the first electric motor M1 while operating the engine 10 in an efficient operating region, thereby steplessly controlling the transmission gear ratio of the stepless transmission unit 21.

Here, the hybrid control device 32 also takes into account the shift position of the stepped transmission unit 22 during the shifting of the stepless transmission unit 21, in order to improve power performance, fuel economy, and the like. Specifically, for example, the hybrid control device 32 sets a target value of a total transmission gear ratio of the power transmitting apparatus 1 such that the engine 10 operates along an optimum fuel consumption rate curve (i.e. a fuel consumption map) of the engine 10. Then, the hybrid control device 32 controls the transmission gear ratio of the stepless transmission unit 21 in view of the transmission gear ratio of the stepped transmission unit 22 to obtain the target value.

At this time, the hybrid control device 32 supplies electric energy generated by the first electric motor M1 to an electrical storage apparatus 12 and the second electric motor M2 via an inverter 11. In other words, a main portion of the power of the engine 10 is mechanically transmitted to the transmitting member 102, but a portion of the power of the engine 10 is converted into the electric energy by the first electric motor M1. If the converted electric energy is supplied to the second electric motor M2 via the inverter 11, an output of the second electric motor M2 is transmitted to the transmitting member 102.

The hybrid control device 32 allows motor driving of the vehicle by a differential action of the stepless transmission unit 21, regardless of a stop or idling state of the engine 10. The hybrid control device 32 can change the rotational speed of the first electric motor M1 to a negative rotational speed in order to improve the fuel economy in the motor driving, and can maintain an engine rotational speed at zero or almost zero, as occasion demands, by the differential action of the stepless transmission unit 21.

The hybrid control device 32 can supply the second electric motor M2 with the electric energy from at least one of the first electric motor M1 and the electrical storage apparatus 12 even during engine driving, can drive the second electric motor M2, and can apply torque to the driving wheels 16, thereby performing so-called torque assist for assisting the power of the engine 10.

The hybrid control device 32 can control the rotational speed of the first electric motor M1 and/or the rotational speed of the second electric motor M2 by the differential action of the differential action of the stepless transmission unit 21, regardless of during stop or driving of the vehicle, and thus can keep the rotational speed of the engine 10 almost constant, or can control it at an arbitrary rotational speed.

A stepped transmission control device 33 performs automatic shift control of the stepped transmission unit 22. For example, on the basis of a shift diagram (i.e. a shift map) set in advance, the stepped transmission control device 33 performs the automatic shift control of the stepped transmission unit 22 to obtain the shift position specified by the shift map.

At this time, the stepped transmission control device 33 directly or indirectly outputs to the hydraulic control circuit 35 a command for engaging and/or disengaging the hydraulic friction engaging apparatuses related to the shifting, such as the first clutch C1, to achieve the specified shift position, for example, in accordance with the engagement operation table shown in FIG. 2.

The hydraulic control circuit 35, for example, disengages the hydraulic friction engaging apparatuses on the disengagement side related to the shifting, and engages the hydraulic friction engaging apparatuses on the disengagement side related to the shifting, in accordance with the command from the stepped transmission control device 33, thereby performing the shifting of the stepped transmission unit 22.

A shift changing apparatus 41 is positioned, for example, next to a driver's seat, and is provided with a shift lever 42 operated to manually select a plurality of shift positions. The shift lever 42 is provided to be manually operated to a parting position "Parking (P)" in which the power transmission path in the power transmitting apparatus 1 is blocked and the output shaft 103 is locked, a reverse position "Reverse (R)" for reverse travel, a neutral position "Neutral (N)" in which the power transmitting apparatus 1 is blocked, an automatic shift driving position "Drive (D)", or a forward manual shift driving position "Manual (M)".

According to the study of the present inventors, the following matters are found in cases where the shifting of the stepless transmission unit and the shifting of the stepped transmission unit are performed in the same timing, in the power transmitting apparatus provided with the stepless transmission unit and the stepped transmission unit as described above. In other words, if shift start timing of the stepless transmission unit is earlier than shift start timing of the stepped transmission unit, there is a driving amount difference (refer to data associated with "on standby at constant pressure" at 0 to 0.2 seconds in a time chart associated with "AT output torque" on the second graph from the top in FIG. 6).

Figure 7:
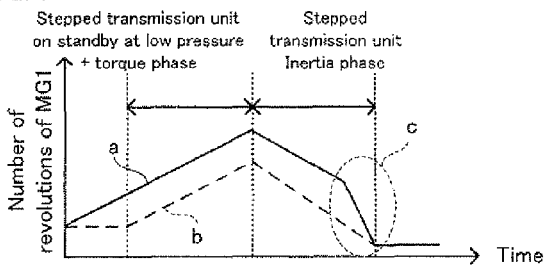
FIG. 7 is a conceptual diagram showing one example of a temporal change in the number of revolutions of a first electric motor during the shifting of the stepless transmission unit.

Moreover, if the shifting of the stepless transmission unit ends earlier than the shifting of the stepped transmission unit, then, as shown by a solid line a in FIG. 7, the number of revolutions of the first electric motor suddenly changes (refer to a circle c in FIG. 7). Then, for example, a difference occurs between a calculation value of inertia torque in the electronic control unit and an actual value of the inertia torque, causing relatively large fluctuation of the driving force. As a result, the deterioration of the drivability possibly occurs, such as, for example, a delay in the way the engine revs up, a driving force difference, and elimination of the driving force.

Figure 6:
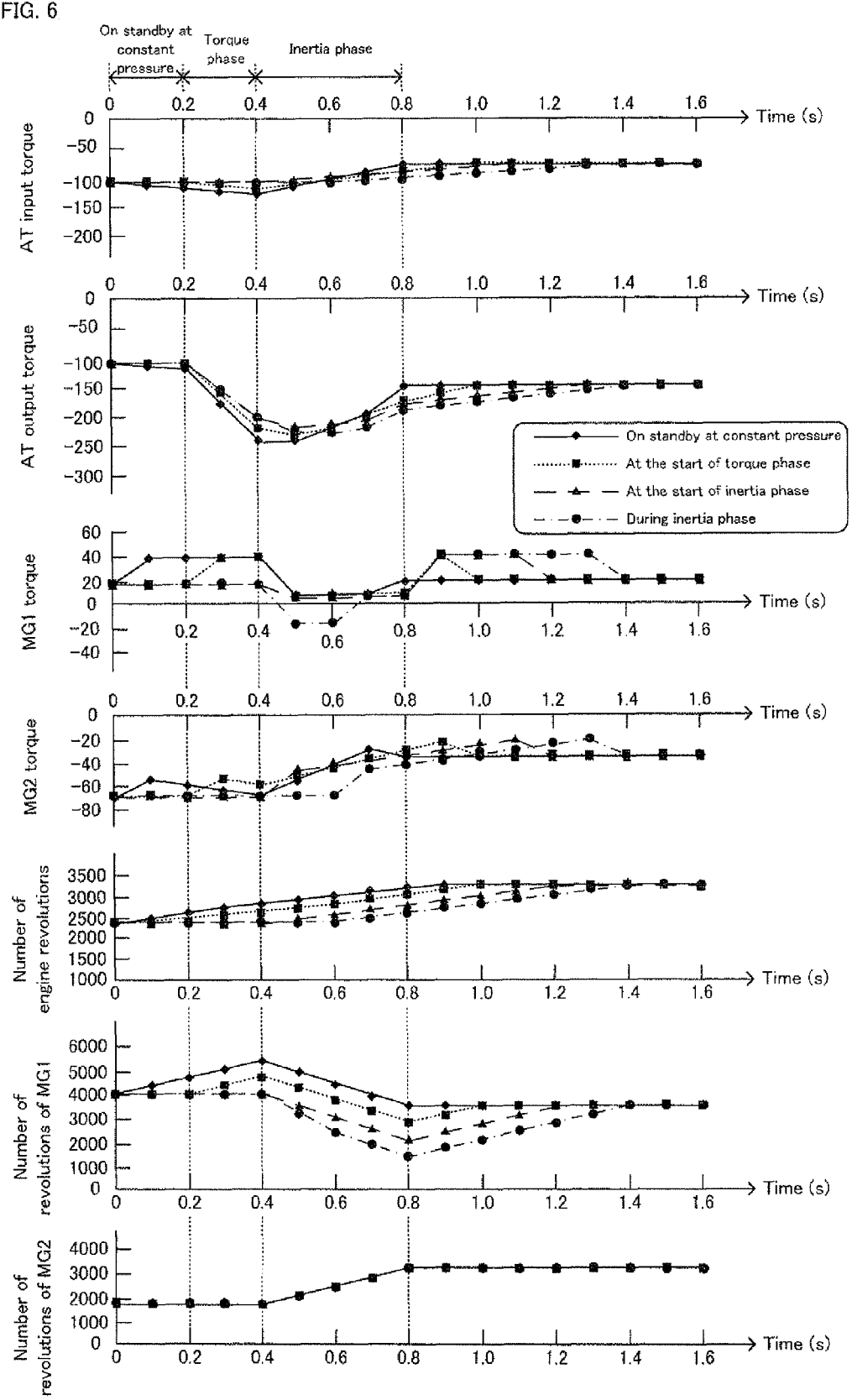
FIG. 6 is one example of a time chart if shift start timing of a stepless transmission unit is changed in cases where there is no battery limit.

Moreover, if the shifting of the stepped transmission unit ends earlier than the shifting of the stepless transmission unit, the shifting of the stepless transmission unit is interrupted, and thus, a shift period becomes relatively long (refer to data associated with each of "at the start of inertia phase" and "during inertia phase" after 0.8 seconds in the time chart associated with "AT output torque" on the second graph from the top in FIG. 6).

FIG. 6 is one example of the time chart if the shift start timing of the stepless transmission unit is changed in cases where there is no battery limit. Here, the "battery limit" means that electric power which can be inputted to and outputted from an electrical storage apparatus is limited due to the state of the electrical storage apparatus, such as residual quantity of the electric power stored in the electrical storage apparatus and temperature of the electrical storage apparatus.

Incidentally, "on standby at constant pressure" means that the shifting of the stepless transmission unit is started while the stepped transmission unit is on standby at a constant pressure. "At the start of torque phase" means that the shifting of the stepless transmission unit is started at the start of the torque phase of the stepped transmission unit (at a time point of 0.2 seconds in FIG. 6). "At the start of inertia phase" means that the shifting of the stepless transmission unit is started at the start of the inertia phase of the stepped transmission unit (at a time point of 0.4 seconds in FIG. 6). "During inertia phase" means that the shifting of the stepless transmission unit is started during the inertia phase of the stepped transmission unit (in a period of 0.4 to 0.8 seconds in FIG. 6).

FIG. 7 is a conceptual diagram showing one example of a temporal change in the number of revolutions of the first electric motor during the shifting of the stepless transmission unit. In FIG. 7, the solid line a shows a temporal change in the number of revolutions of the first electric motor if the shifting of the stepless transmission unit ends earlier than the shifting of the stepped transmission unit. On the other hand, a dashed line b shows a temporal change in the number of revolutions of the first electric motor if shift end timing of the stepless transmission unit is simultaneous with shift end timing of the stepped transmission unit.

In order to suppress the technical problems caused by the difference between the shift end timing of the stepless transmission unit and the shift end timing of the stepped transmission unit described above, a simultaneous shift control device 34 provided for the electronic control unit 30 controls the hybrid control device 32 and the stepped transmission control device 33 to start control associated with the stepless transmission unit 21 and control associated with the stepped transmission unit 22, respectively, such that the shift end timing of the stepless transmission unit 21 is synchronized with the shift end timing of the stepped transmission unit 22. As a result, as shown by the dashed line b, it is possible to avoid a sudden change in the number of revolutions of the first electric motor M1.

In order to realize the aforementioned control, the hybrid control device 32 is provided with a shift state judging device 321 and a shift time calculating device 322. The stepped transmission control device 33 is provided with a simultaneous shift judging device 331, a shift state judging device 332, and a shift time calculating device 333.

The shift state judging device 321 judges a shift state of the stepless transmission unit 21 (i.e. a current state of the stepless transmission unit 21). The shift time calculating device 322 calculates a shift time, which is a time required until the shift state of the stepless transmission unit 21 becomes into a requested shift state when there is a shift request for the stepless transmission unit 21

The simultaneous shift judging device 331 judges whether or not a signal outputted from the shift changing apparatus 41 or a signal outputted from the hybrid control device 32 requires simultaneous shifting of the stepless transmission unit 21 and the stepped transmission unit 22. The shift state judging device 332 judges a shift state of the stepped transmission unit 22 (i.e. a current state of the stepped transmission unit 22). The shift time calculating device 333 calculates a shift time, which is a time required until the shift state of the stepped transmission unit 22 becomes into a requested shift state when there is a shift request for the stepped transmission unit 22.

Incidentally, the "shift time calculating devices 322 and 333" in the first embodiment are one example of the "operating device" of the present invention.

Specifically, if it is judged by the simultaneous shift judging device 331 that the simultaneous shifting of the stepless transmission unit 21 and the stepped transmission unit 22 is requested, the shift time calculating devices 322 calculates the shift time of the stepless transmission unit 21, and the shift time calculating devices 333 calculates the shift time of the stepped transmission unit 22.

The simultaneous shift control device 34 determines timing to start the shifting of each of the stepless transmission unit 21 and the stepped transmission unit 22 in accordance with a result of comparison between the shift time of the stepless transmission unit 21 and the shift time of the stepped transmission unit 22. Then, the simultaneous shift control device 34 controls the hybrid control device 32 and the stepped transmission control device 33 to start the shifting of the stepless transmission unit 21 and the stepped transmission unit 22 in respective timing, respectively.

More specifically, the simultaneous shift control device 34 determines the timing to start the shifting of each of the stepless transmission unit 21 and the stepped transmission unit 22 such that the shifting of the stepless transmission unit 21 is started after an elapse of time corresponding to a difference between the shift time of the stepless transmission unit 21 and the shift time of the stepped transmission unit 22, after the shifting of the stepped transmission unit 22 is started, if the shift time of the stepless transmission unit 21 is longer than the shift time of the stepped transmission unit 22.

On the other hand, the simultaneous shift control device 34 determines the timing to start the shifting of each of the stepless transmission unit 21 and the stepped transmission unit 22 such that the shifting of the stepped transmission unit 22 is started after an elapse of time corresponding to the difference between the shift time of the stepless transmission unit 21 and the shift time of the stepped transmission unit 22, after the shifting of the stepless transmission unit 21 is started, if the shift time of the stepped transmission unit 22 is longer than the shift time of the stepless transmission unit 21.

As a result, the simultaneous shift control device 34 can control the hybrid control device 32 and the stepped transmission control device 33 to start the control associated with the stepless transmission unit 21 and the control associated with the stepped transmission unit 22, respectively, such that the shift end timing of the stepless transmission unit 21 is synchronized with the shift end timing of the stepped transmission unit 22.

By the way, for example, due to a calculation error in any of the simultaneous shift control device 34 and the shift time calculating devices 322 and 333, even if the timing to start the shifting of each of the stepless transmission unit 21 and the stepped transmission unit 22 is determined such that the shift end timing of the stepless transmission unit 21 is synchronized with the shift end timing of the stepped transmission unit 22, there is a gap between the timing to start the shifting of each of the stepless transmission unit 21 and the stepped transmission unit 22 in cases where there is no calculation error and the actual timing to start the shifting of each of the stepless transmission unit 21 and the stepped transmission unit 22, and thus, the shift end timing of the stepless transmission unit 21 and the shift end timing of the stepped transmission unit 22 are different from each other in some cases.

Alternatively, due to a scatter of the shifting of at least one of the stepless transmission unit 21 and the stepped transmission unit 22, even if the timing to start the shifting of each of the stepless transmission unit 21 and the stepped transmission unit 22 is determined such that the shift end timing of the stepless transmission unit 21 is synchronized with the shift end timing of the stepped transmission unit 22, the shift end timing of the stepless transmission unit 21 and the shift end timing of the stepped transmission unit 22 are different from each other in some cases.

Thus, in the first embodiment, if it is judged by the simultaneous shift control device 34 that the shift end timing of the stepless transmission unit 21 and the shift end timing of the stepped transmission unit 22 are different from each other on the basis of signals outputted from the shift state judging devices 321 and 332, the simultaneous shift control device 34 controls the hybrid control device 32 to change (or correct) a shift rate of the stepless transmission unit 21 at the start of the inertia phase or during the inertia phase of the shifting of the stepped transmission unit 22.

Figure 8:
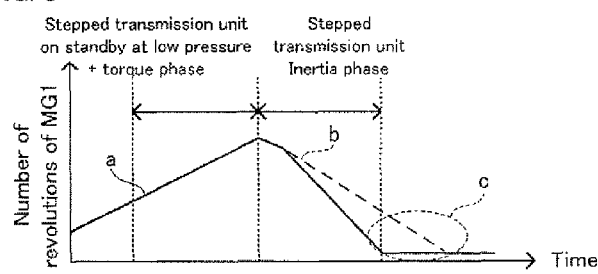
FIG. 8 is a conceptual diagram showing another example of the temporal change in the number of revolutions of the first electric motor during the shifting of the stepless transmission unit.

For example, as shown by a dashed line in FIG. 8, if it is judged that the shift end timing of the stepless transmission unit 21 is slower than the shift end timing of the stepped transmission unit 22 (refer to a circle c in FIG. 8), the simultaneous shift control device 34 controls the hybrid control device 32 to change the shift rate of the stepless transmission unit 21 during the inertia phase of the shifting of the stepped transmission unit 22, as shown by a solid line a in FIG. 8. This makes it possible to synchronize the shift end timing of the stepless transmission unit 21 with the shift end timing of the stepped transmission unit 22.

FIG. 8 is a conceptual diagram showing another example of the temporal change in the number of revolutions of the first electric motor during the shifting of the stepless transmission unit. In FIG. 8, the solid line a shows the temporal change in the number of revolutions of the first electric motor if a rate of the number of revolutions of the first electric motor is changed during the inertia phase of the shifting of the stepless transmission unit 22. On the other hand, a dashed line b shows the temporal change in the number of revolutions of the first electric motor if the rate of the number of revolutions of the first electric motor is not changed.

Next, shift control processing performed by the electronic control unit 30 mainly during the driving of the vehicle equipped with the power transmitting apparatus 1 as configured above is explained with reference to a flowchart in FIG. 9. The simultaneous shift control processing is performed with a regular or irregular period, or continuously, mainly during the driving of the vehicle.

Figure 9:
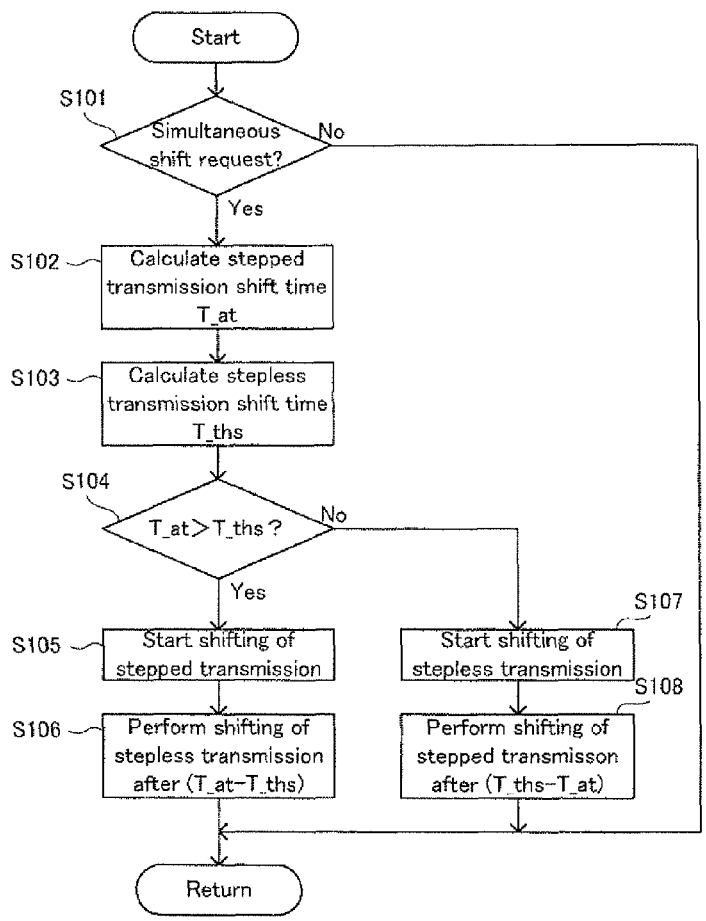
FIG. 9 is a flowchart showing simultaneous shift control processing performed by the electronic control unit in the first embodiment.

In FIG. 9, firstly, the simultaneous shift judging device 331 judges whether or not there is a simultaneous shift request, on the basis of the signal outputted from the shift changing apparatus 41 or the signal outputted from the hybrid control device 32 (step S101). If it is judged that there is no simultaneous shift request (the step S101: No), the electronic control unit 30 ends the processing.

On the other hand, if it is judged that there is the simultaneous shift request (the step S101: Yes), the shift time calculating device 333 calculates a shift time (T_at) associated with the stepped transmission unit 22 (step S102). Before or after the processing in the step S102, the shift time calculating device 322 calculates a shift time (T_ths) associated with the stepless transmission unit 21 (step S103).

Then, the simultaneous shift control device 34 judges whether or not the shift time (T_at) associated with the stepped transmission unit 22 is longer than the shift time (T_ths) associated with the stepless transmission unit 21 (step S104). If it is judged that the shift time (T_at) associated with the stepped transmission unit 22 is longer than the shift time (T_ths) associated with the stepless transmission unit 21 (the step S104: Yes), the simultaneous shift control device 34 controls the stepped transmission control device 33 to start the shifting of the stepped transmission unit 22 (step S105).

Then, the simultaneous shift control device 34 controls the hybrid control device 32 to start the shifting of the stepless transmission unit 21 after an elapse of time (T_at−T_ths), which is obtained by subtracting the shift time (T_ths) associated with the stepless transmission unit 21 from the shift time (T_at) associated with the stepped transmission unit 22 (step S106).

In the processing in the step S104, if it is judged that the shift time (T_at) associated with the stepped transmission unit 22 is shorter than the shift time (T_ths) associated with the stepless transmission unit 21 (the step S104: No), the simultaneous shift control device 34 controls the hybrid control device 32 to start the shifting of the stepless transmission unit 21 (step S107).

Then, the simultaneous shift control device 34 controls the stepped transmission control device 33 to start the shifting of the stepped transmission unit 22 after an elapse of time (T_ths−T_at), which is obtained by subtracting the shift time (T_at) associated with the stepped transmission unit 22 from the shift time (T_ths) associated with the stepless transmission unit 21 (step S108).

Incidentally, if the shift time (T_at) associated with the stepped transmission unit 22 is "equal to" the shift time (T_ths) associated with the stepless transmission unit 21, either one may be included in the other and treated.

Incidentally, the processing associated with the change in the shift rate described above is performed by the simultaneous shift control device 34, on the basis of a signal outputted from each of the shift state judging devices 321 and 332, after the processing in the step S106 or S108 in FIG. 9.

Second Embodiment

A second embodiment of the power transmitting apparatus of the present invention is explained with reference to a flowchart in FIG. 10. The second embodiment has the same configuration as that of the first embodiment, except having different simultaneous shift control processing performed by the electronic control unit. Thus, in the second embodiment, a duplication of the explanation in the first embodiment is omitted. Common portions on the drawing carry the same reference numerals, and only basically different points are explained with reference to FIG. 10.

In the second embodiment, if it is judged that there is the simultaneous shift request for the stepless transmission unit 21 and the stepped transmission unit 22, the simultaneous shift control device 34 controls the hybrid control device 32 to perform the shifting of the stepless transmission unit 21 before the start of the inertia phase of the shifting of the stepped transmission unit 22. This makes it possible to prevent the delay in the way the engine 10 revs up. Moreover, it is possible to prevent a delay in the shift end timing of the stepless transmission unit 21.

Next, shift control processing performed by the electronic control unit 30 mainly during the driving of the vehicle equipped with the power transmitting apparatus 1 as configured above is explained with reference to a flowchart in FIG. 10.

Figure 10:
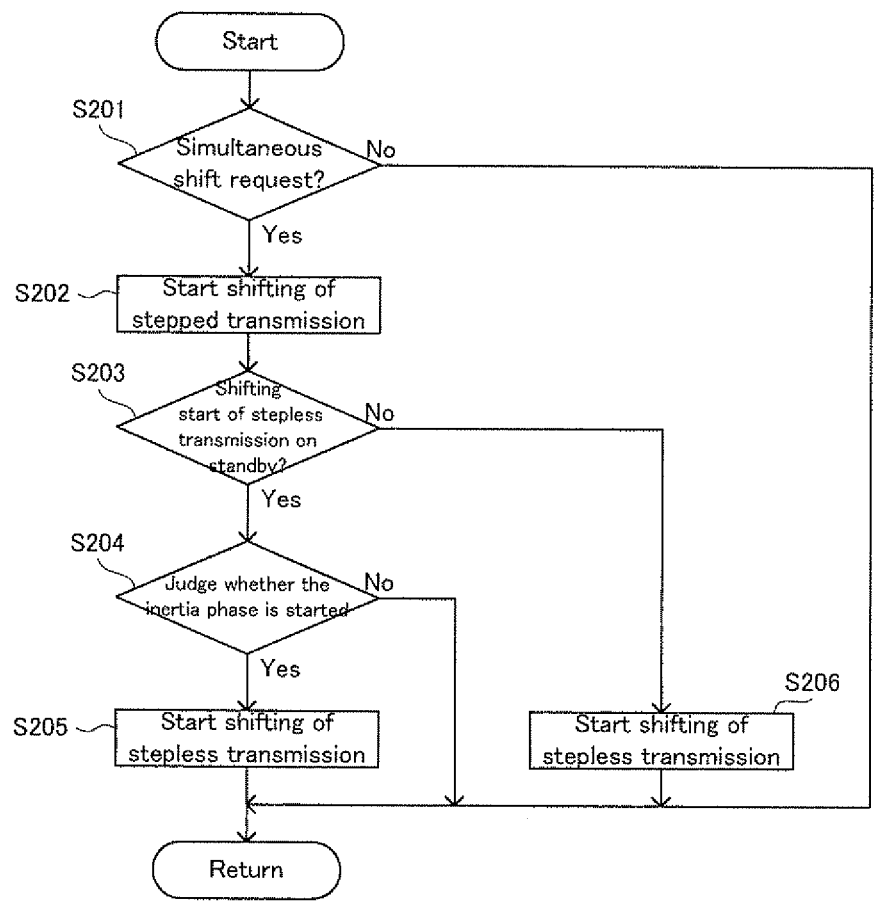
FIG. 10 is a flowchart showing simultaneous shift control processing performed by the electronic control unit in a second embodiment.

In FIG. 10, firstly, the simultaneous shift judging device 331 judges whether or not there is a simultaneous shift request, on the basis of the signal outputted from the shift changing apparatus 41 or the signal outputted from the hybrid control device 32 (step S201). If it is judged that there is no simultaneous shift request (the step S201: No), the electronic control unit 30 ends the processing.

On the other hand, if it is judged that there is the simultaneous shift request (the step S201: Yes), the simultaneous shift control device 34 controls the stepped transmission control device 33 to start the shifting of the stepped transmission unit 22 (step S202). Then, the simultaneous shift control device 34 judges whether or not the shift control associated with the stepless transmission unit 21 is on standby (step S203).

If it is judged that the shift control associated with the stepless transmission unit 21 is not on standby (the step S203: No), the simultaneous shift control device 34 controls the hybrid control device 32 to start the shifting of the stepless transmission unit 21 (step S206). On the other hand, if it is judged that the shift control associated with the stepless transmission unit 21 is on standby (the step S203: Yes), the simultaneous shift control device 34 judges whether the inertia phase of the shifting of the stepped transmission unit 22 is started (step S204).

If it is judged that the inertia phase of the shifting of the stepped transmission unit 22 is started (the step S204: Yes), the simultaneous shift control device 34 controls the hybrid control device 32 to start the shifting of the stepless transmission unit 21 (step S205). On the other hand, if it is judged that the inertia phase of the shifting of the stepped transmission unit 22 is not started (the step S204: No), the electronic control unit 30 ends the processing once.

Third Embodiment

A third embodiment of the power transmitting apparatus of the present invention is explained with reference to FIG. 11 and FIG. 12. The third embodiment has the same configuration as that of the first embodiment, except having different simultaneous shift control processing performed by the electronic control unit. Thus, in the third embodiment, a duplication of the explanation in the first embodiment is omitted. Common portions on the drawing carry the same reference numerals, and only basically different points are explained with reference to FIG. 11 and FIG. 12.

According to the study of the present inventors, the following matters are found in cases where the shifting of the stepless transmission unit and the shifting of the stepped transmission unit are performed in the same timing and in cases where there is a battery limit, in the power transmitting apparatus provided with the stepless transmission unit and the stepped transmission unit as described above. In other words, if the shifting of the stepped transmission unit ends earlier than the shifting of the stepless transmission unit, the shifting of the stepless transmission unit is interrupted. Thus, the shift period becomes relatively long, and there is a driving force difference (refer to data associated with each of "at the start of torque phase", "at the start of inertia phase", and "during inertia phase" after 0.8 seconds in a time chart associated with "AT output torque" on the first graph in FIG. 11).

Figure 11:
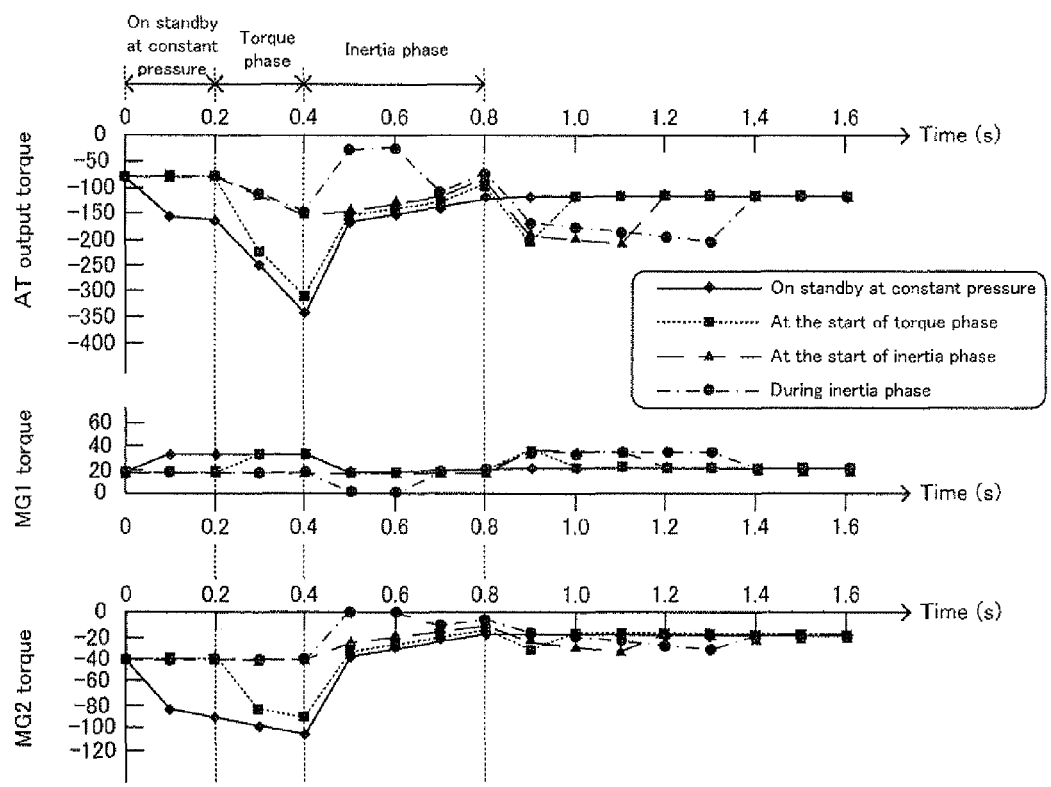
FIG. 11 is one example of a time chart if the shift start timing of the stepless transmission unit is changed if there is a battery limit.

FIG. 11 is one example of a time chart if the shift start timing of the stepless transmission unit is changed if there is the battery limit. Incidentally, the meanings of "on standby at constant pressure", "at the start of torque phase", "at the start of inertia phase", and "during inertia phase" are the same as those in FIG. 6.

In the third embodiment, if it is judged that the simultaneous shifting of the stepless transmission unit 21 and the stepped transmission unit 22 is requested, the simultaneous shift control device 34 controls each of the hybrid control device 32 and the stepped transmission control device 33 such that the shift control associated with the steles transmission unit 21 ends before the end of the shift control associated with the stepped transmission unit 22. This makes it possible to suppress the driving force difference, caused by the shift control associated with the stepless transmission unit 21 after the end of the shift control associated with the stepped transmission unit 22.

Next, shift control processing performed by the electronic control unit 30 mainly during the driving of the vehicle equipped with the power transmitting apparatus 1 as configured above is explained with reference to a flowchart in FIG. 12.

Figure 12:
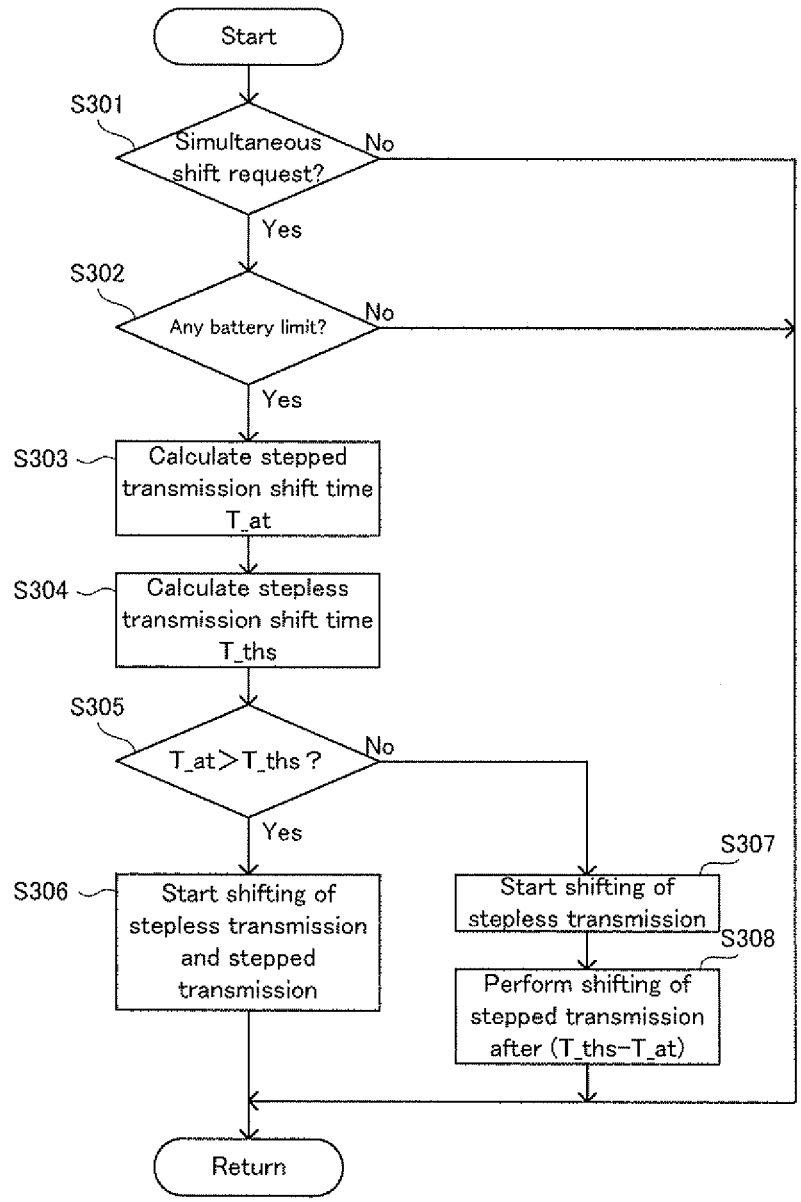
FIG. 12 is a flowchart showing simultaneous shift control processing performed by the electronic control unit in a third embodiment.

In FIG. 12, firstly, the simultaneous shift judging device 331 judges whether or not there is a simultaneous shift request on the basis of the signal outputted from the shift changing apparatus 41 or the signal outputted from the hybrid control device 32 (step S301). If it is judged that there is no simultaneous shift (the step S301: No), the electronic control unit 30 ends the processing.

On the other hand, if it is judged that there is the simultaneous shift request (the step S301: Yes), the simultaneous shift control device 34 judges whether or not there is a battery limit (step S302). If it is judged that there is no battery limit (the step S302: No), the electronic control unit 30 ends the processing. On the other hand, if it is judged that there is the battery limit (the step S302: Yes), the shift time calculating device 333 calculates the shift time (T_at) associated with the stepped transmission unit 22 (step S303). Before or after the processing in the step S303, the shift time calculating device 322 calculates the shift time (T_ths) associated with the stepless transmission unit 21 (step S304).

Then, the simultaneous shift control device 34 judges whether or not the shift time (T_at) associated with the stepped transmission unit 22 is longer than the shift time (T_ths) associated with the stepless transmission unit 21 (step S305). If it is judged that the shift time (T_at) associated with the stepped transmission unit 22 is longer than the shift time (T_ths) associated with the stepless transmission unit 21 (the step S305: Yes), the simultaneous shift control device 34 controls the hybrid control device 32 and the stepped transmission control device 33 to start the shifting of the stepless transmission unit 21 and the stepped transmission unit 22, respectively (step S306).

In the processing in the step S305, if it is judged that the shift time (T_at) associated with the stepped transmission unit 22 is shorter than the shift time (T_ths) associated with the stepless transmission unit 21 (the step S305: No), the simultaneous shift control device 34 controls the hybrid control device 32 to start the shifting of the stepless transmission unit 21 (step S307).

Then, the simultaneous shift control device 34 controls the stepped transmission control device 33 to start the shifting of the stepped transmission unit 22 after an elapse of time (T_ths−T_at), which is obtained by subtracting the shift time (T_at) associated with the stepped transmission unit 22 from the shift time (T_ths) associated with the stepless transmission unit 21 (step S308).

Incidentally, if the shift time (T_at) associated with the stepped transmission unit 22 is "equal to" the shift time (T_ths) associated with the stepless transmission unit 21, either one may be included in the other and treated.

The present invention is not limited to the aforementioned embodiment, but various changes may be made, if desired, without departing from the essence or spirit of the invention which can be read from the claims and the entire specification. A power transmitting apparatus, which involves such changes, is also intended to be within the technical scope of the present invention.

DESCRIPTION OF REFERENCE CODES

1 power transmitting apparatus
10 engine
11 inverter
12 electrical storage apparatus
21 stepless transmission unit
22 stepped transmission unit
24, 25, 26 planetary gear mechanism
30 electronic control unit
31 engine control device
32 hybrid control device
33 stepped transmission control device
34 simultaneous shift control device
35 hydraulic control circuit
41 shift changing apparatus

The invention claimed is:

1. A power transmitting apparatus, mounted on a vehicle and comprising a stepless transmission unit and a stepped transmission unit,
    said power transmission apparatus comprising a control device for starting each of first shift control, which is control associated with shifting of the stepless transmission unit, and second shift control, which is control associated with shifting of the stepped transmission unit, such that shift end timing of the stepless transmission unit is synchronized with shift end timing of the stepped transmission unit, in a condition that shift requests for the stepless transmission unit and the stepped transmission unit are detected in the same timing,
    wherein the shift request for the stepless transmission unit and the shift request for the stepped transmission unit are independent of each other.

2. The power transmitting apparatus according to claim 1, wherein said control device changes a shift rate of the stepless transmission unit at the start of an inertia phase of the stepped transmission unit or during the inertia phase, if the first shift control and the second shift control are started such that the shift end timing of the stepless transmission unit is synchronized with the shift end timing of the stepped transmission unit and if there is a gap between a time point at which at least one of the first shift control and the second shift control is actually started and a time point for which the start of the at least one control is scheduled.

3. The power transmitting apparatus according to claim 1, wherein said control device
    includes an operating device for operating a first shift time, which is a time for the first shift control, and a second shift time, which is a time for the second shift control, and
    starts each of the first shift control and the second shift control in accordance with a difference between the operated first shift time and the operated second shift time, such that the shift end timing of the stepless transmission unit is synchronized with the shift end timing of the stepped transmission unit.

4. The power transmitting apparatus according to claim 1, wherein the stepless transmission unit has:
    a differential mechanism including a plurality of rotating elements;
    a first electric motor connected to one of the plurality of rotating elements; and
    a second electric motor connected to another rotating element of the plurality of rotating elements.

5. The power transmitting apparatus according to claim 4, wherein the shifting of the stepless transmission unit is performed at least one of the first electric motor and the second electric motor.

6. The power transmitting apparatus according to claim 1, wherein the stepless transmission unit and the stepped transmission unit are connected to each other in series between a power source of the vehicle and an output shaft of the vehicle.

7. The power transmitting apparatus according to claim 1, wherein cases where the shift requests for the stepless transmission unit and the stepped transmission unit are detected in the same timing are cases where the shift is performed such that the number of revolutions of an engine changes in the vehicle connected to the stepless transmission unit and the stepped transmission unit.

8. A power transmitting apparatus, mounted on a vehicle and comprising a stepless transmission unit and a stepped transmission unit,
    said power transmission apparatus comprising a control device for starting each of first shift control, which is control associated with shifting of the stepless transmission unit, and second shift control, which is control associated with shifting of the stepped transmission unit, such that shift end timing of the stepless transmission unit is synchronized with shift end timing of the stepped transmission unit, in a condition that shift requests for the stepless transmission unit and the stepped transmission unit are detected in the same timing,
    wherein said control device changes a shift rate of the stepless transmission unit at the start of an inertia phase of the stepped transmission unit or during the inertia phase, if the first shift control and the second shift control are started such that the shift end timing of the stepless transmission unit is synchronized with the shift end timing of the stepped transmission unit and if there is a gap between a time point at which at least one of the first shift control and the second shift control is actually started and a time point for which the start of the at least one control is scheduled.

9. The power transmitting apparatus according to claim 8, wherein said control device
- includes an operating device for operating a first shift time, which is a time for the first shift control, and a second shift time, which is a time for the second shift control, and
- starts each of the first shift control and the second shift control in accordance with a difference between the operated first shift time and the operated second shift time, such that the shift end timing of the stepless transmission unit is synchronized with the shift end timing of the stepped transmission unit.

10. The power transmitting apparatus according to claim 8, wherein the stepless transmission unit has:
- a differential mechanism including a plurality of rotating elements;
- a first electric motor connected to one of the plurality of rotating elements; and
- a second electric motor connected to another rotating element of the plurality of rotating elements.

11. The power transmitting apparatus according to claim 10, wherein the shifting of the stepless transmission unit is performed at least one of the first electric motor and the second electric motor.

12. The power transmitting apparatus according to claim 8, wherein the stepless transmission unit and the stepped transmission unit are connected to each other in series between a power source of the vehicle and an output shaft of the vehicle.

13. The power transmitting apparatus according to claim 8, wherein the shift request for the stepless transmission unit and the shift request for the stepped transmission unit are independent of each other.

14. The power transmitting apparatus according to claim 8, wherein cases where the shift requests for the stepless transmission unit and the stepped transmission unit are detected in the same timing are cases where the shift is performed such that the number of revolutions of an engine changes in the vehicle connected to the stepless transmission unit and the stepped transmission unit.

* * * * *